(12) United States Patent
Vaykole et al.

(10) Patent No.: US 11,349,930 B2
(45) Date of Patent: May 31, 2022

(54) IDENTIFYING AND DELETING IDLE REMOTE SESSIONS IN A DISTRIBUTED FILE SYSTEM

(71) Applicant: EMC IP Holding Company LLC, Hopkinton, MA (US)

(72) Inventors: Tejas Anil Vaykole, Pune (IN); Kaushik Gupta, Singhbhum (IN); Pratik Rupala, Gujarat (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 65 days.

(21) Appl. No.: 16/688,183

(22) Filed: Nov. 19, 2019

(65) Prior Publication Data

US 2021/0152624 A1    May 20, 2021

(51) Int. Cl.
| | | |
|---|---|---|
| G06F 16/176 | (2019.01) | |
| G06F 16/182 | (2019.01) | |
| H04L 61/5007 | (2022.01) | |
| H04L 67/06 | (2022.01) | |
| H04L 67/10 | (2022.01) | |
| H04L 67/143 | (2022.01) | |
| H04L 67/01 | (2022.01) | |
| H04L 67/14 | (2022.01) | |
| G06F 16/23 | (2019.01) | |
| H04L 67/141 | (2022.01) | |

(52) U.S. Cl.
CPC .......... *H04L 67/14* (2013.01); *G06F 16/1774* (2019.01); *G06F 16/183* (2019.01); *G06F 16/2336* (2019.01); *H04L 61/2007* (2013.01); *H04L 67/06* (2013.01); *H04L 67/10* (2013.01); *H04L 67/141* (2013.01); *H04L 67/143* (2013.01); *H04L 67/42* (2013.01)

(58) Field of Classification Search
CPC ....... H04L 67/14; H04L 67/143; H04L 67/10; H04L 67/141; H04L 67/06; H04L 61/2007; H04L 67/42; G06F 16/183; G06F 16/1774; G06F 16/2336
See application file for complete search history.

(56) References Cited

U.S. PATENT DOCUMENTS

| | | |
|---|---|---|
| 10,007,704 B1 | 6/2018 | Carey et al. |
| 10,257,859 B1 | 4/2019 | Chu et al. |

(Continued)

OTHER PUBLICATIONS

Author: Ian W. Stirk, Title: "SQL_Server_DMVs_in_Action", Publisher: Manning Publication Co., Pertinent Chaper: Chapter 8 (Year: 2011).*

(Continued)

*Primary Examiner* — Ramy M Osman
*Assistant Examiner* — Kamal Hossain
(74) *Attorney, Agent, or Firm* — Amin, Turocy & Watson, LLP

(57) ABSTRACT

Techniques are provided for identifying and deleting idle remote sessions in a distributed file system. In an example, a server that serves a plurality of server message block (SMB) sessions analyzes those sessions to determine which sessions are idle. Of the idle sessions, the server can determine which possess a lock on a computer file. Where another, active session is waiting for that resource, the server can terminate the idle session and release the lock so that the active session acquires access to the requested computer file.

20 Claims, 11 Drawing Sheets

(56) References Cited

U.S. PATENT DOCUMENTS

| | | | |
|---|---|---|---|
| 10,713,080 B1 | 7/2020 | Brooker et al. | |
| 2003/0182285 A1* | 9/2003 | Kuwata | G06F 16/958 |
| 2009/0106247 A1* | 4/2009 | Daughtry | G06F 21/604 |
| 2009/0113050 A1* | 4/2009 | Hatanaka | H04L 29/06 |
| | | | 709/224 |
| 2009/0228429 A1 | 9/2009 | Diaconu et al. | |
| 2015/0200817 A1* | 7/2015 | Mulchandani | H04L 67/28 |
| | | | 709/223 |
| 2015/0278397 A1 | 10/2015 | Hendrickson et al. | |
| 2015/0280959 A1* | 10/2015 | Vincent | H04L 67/1097 |
| | | | 709/203 |
| 2018/0077243 A1* | 3/2018 | Mathew | H04L 67/143 |
| 2018/0167454 A1* | 6/2018 | Ambach | H04L 67/1008 |
| 2019/0116160 A1 | 4/2019 | Bhat et al. | |
| 2020/0099753 A1* | 3/2020 | Fleck | H04L 67/24 |

OTHER PUBLICATIONS

Office Action dated Aug. 23, 2021 for U.S. Appl. No. 16/725,498, 69 pages.

\* cited by examiner

200

400

| SMB Sessions Table | | 402 | 404 | 406 |
|---|---|---|---|---|
| | Session ID | | Active Time | Idle Time |
| 408a | 1 | | 98765 | 20 |
| 408b | 2 | | 87654 | 30 |
| 408c | 3 | | 76543 | 600 |
| 408d | 4 | | 65432 | 700 |
| 408e | 5 | | 54321 | 10 |

| | 502 | 504 | 506 | 510 |
|---|---|---|---|---|
| SMB Operations Table | Session ID | File Path | Requested Lock | Lock Acquired |
| 508a | 1 | /ifs/home/a | Exclusive | False |
| 508b | 2 | /ifs/home/a | Exclusive | False |
| 508c | 3 | /ifs/home/a | Exclusive | True |
| 508d | 4 | /ifs/home/b | Exclusive | True |
| 508e | 5 | /ifs/home/b | Exclusive | False |

# IDENTIFYING AND DELETING IDLE REMOTE SESSIONS IN A DISTRIBUTED FILE SYSTEM

TECHNICAL FIELD

The present application relates generally to remote sessions with a distributed file system.

BACKGROUND

In some examples, a distributed file system organizes a plurality of file shares that are distributed across multiple computing nodes of a computer system. A distributed file system can offer a single namespace across the multiple nodes of the computer system and that can be accessed by a computer that has established a remote session with the distributed file system. In some examples, a Server Message Block (SMB, sometimes referred to as Samba) network communication protocol can be utilized in establishing and conducting the remote session. A distributed file system can also offer data redundancy via, for example, replicating a file across multiple computing nodes of a computer system.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which:

FIG. 4 illustrates an example user interface that presents information that can be fetched from SMB operations database, in accordance with certain embodiments of this disclosure;

FIG. 5 illustrates another example user interface that presents information that can be fetched from SMB operations database, in accordance with certain embodiments of this disclosure;

FIG. 10 illustrates another example process flow that can facilitate identifying and deleting idle remote sessions in a distributed file system, in accordance with certain embodiments of this disclosure;

DETAILED DESCRIPTION

Overview

A SMB session can take a lock on network shared files, and then become idle. SMB deals with file locking, preventing file corruption, and data loss when two or more clients try to simultaneously edit the same file. There can be situations where a file unlock must be effectuated manually and by force—for example, when a file was closed but its corresponding lock was not properly released by SMB.

There can be a problem with manually unlocking files, because it is not a scalable approach due to requiring an administrator to perform several operations by hand, including: (a) listing all of the SMB sessions in all of the nodes; (b) identifying the session that is both idle and holding a write lock; and (c) removing that session.

In some examples, a solution to a problem with manually unlocking files involves automating aspects of this process. Such a solution can include: (a) providing a dashboard with all of the information that an administrator needs to decide whether a session should be removed; and (b) proposing which session should be terminated.

In some architectures, whenever a SMB request hits a SMB server, a corresponding session is opened for the client Internet Protocol (IP) address for a specific user. User(s) can read from and write to network-attached files using one or more sessions. A SMB server can store information about a session, such as the client IP address, the user, and which files are locked by the session in a database.

When an idle session has locked a file, this information about sessions that is stored by a SMB server can be used to kill the most appropriate SMB process that has an exclusive lock on one or more files, and is an idle session. When a user provides a request to find idle sessions with some filter options, the idle SMB sessions can be identified and displayed out to the user, so as to take appropriate cleanup actions. The filter options can be based on user, client IP address, and files and/or resource. Such an approach can begin with finding idle sessions on the machine. Then, files locked by these idle sessions can be found and stored into a database that is distributed and accessible by all nodes of the cluster. Depending on the filter options, idle sessions can be accessed and filtered by an API, and only session information that matches the filters may be displayed. Such an approach may be implemented on each node of a cluster.

Example Architectures

Figure 1:
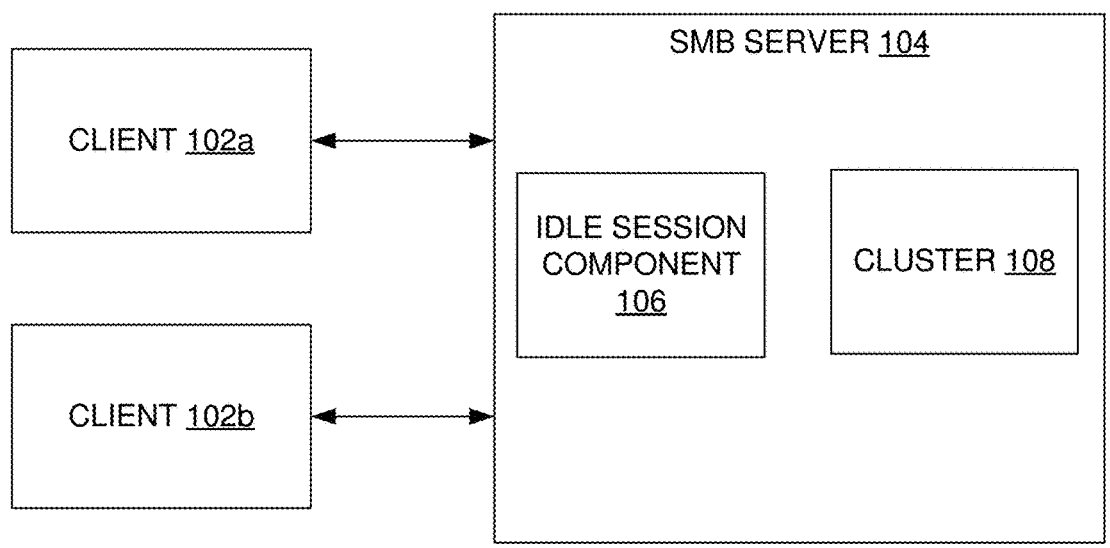
FIG. 1 illustrates a block diagram of an example computer system that can facilitate identifying and deleting idle remote sessions in a distributed file system, in accordance with certain embodiments of this disclosure.

FIG. 1 illustrates a block diagram of an example computer system 100 that can facilitate identifying and deleting idle remote sessions in a distributed file system, in accordance with certain embodiments of this disclosure. Computer system 100 comprises client 102a, client 102b, and SMB server 104. In turn, SMB server 104 comprises idle session component 106, and cluster 108.

Figure 11:
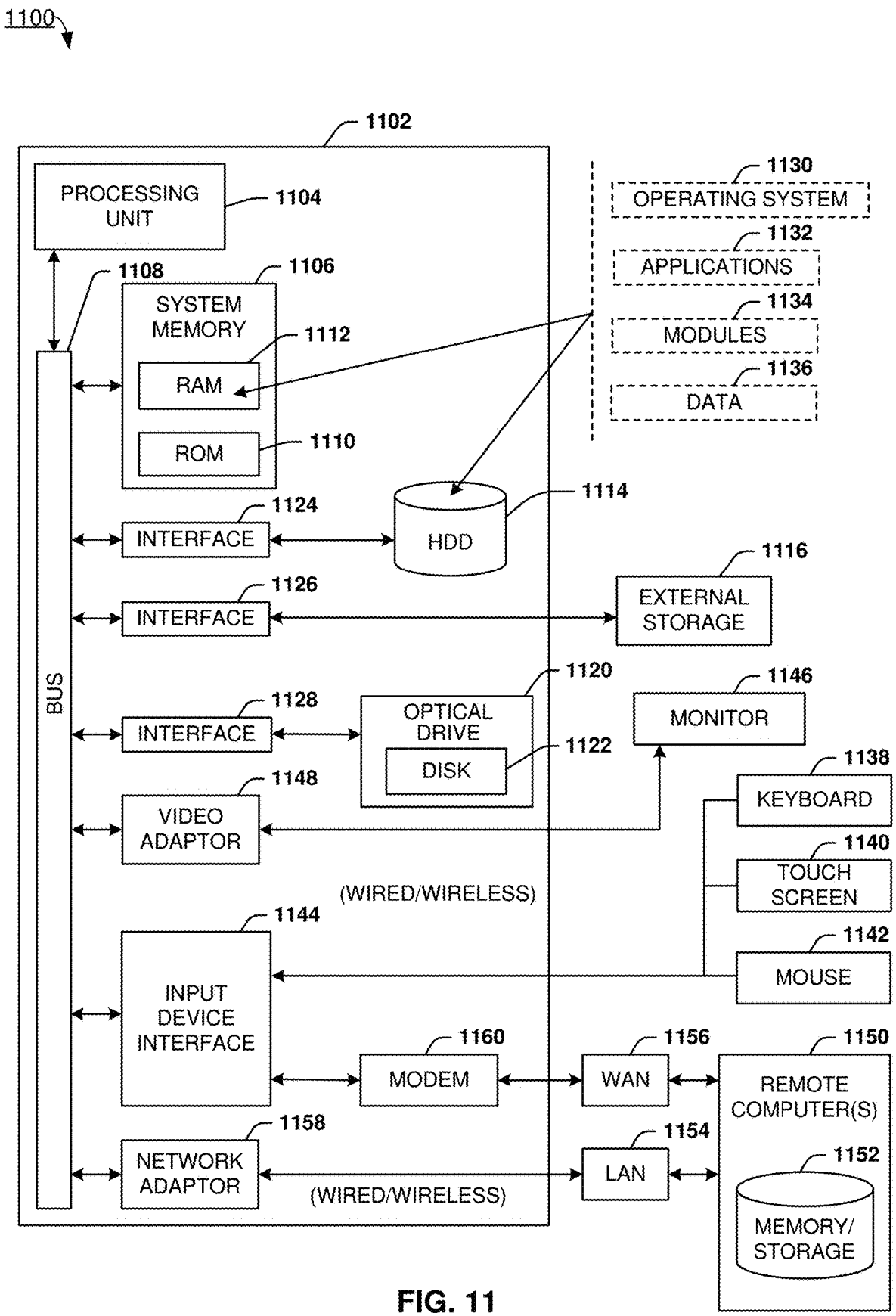
FIG. 11 illustrates an example block diagram of a computer operable to execute certain embodiments of this disclosure.

Each of client 102a and client 102b can comprise computers that implement one or more aspects of computing environment 1100 of FIG. 11. Each of client 102a and client 102b can be configured to establish a remote session with SMB server 104. This remote session can comprise a SMB session. In examples where a remote session can be considered to have a client and a server as participants to the remote session, each of client 102a and client 102b can operate as a client to the remote session, and SMB server 104 can operate as a server to the remote session.

As depicted in computer system 100, client 102a has established a remote session with SMB server 104, and client 102b has established a separate remote session with SMB server 104. Each of client 102a and client 102b can utilize its respective remote session to access resources of SMB server 104. In some examples, each of client 102a and client 102b can access resources that are files stored on SMB server 104, such as to read, write, and/or modify those files. In some examples, accessing these resources can comprise obtaining a lock on the resource.

SMB server 104 comprises idle session component 106. In some examples, idle session component can comprise a process that is hosted and executed by one or more computers of SMB server 104. Idle session component 106 can be configured to facilitate identifying and deleting idle remote sessions in a distributed file system.

Figure 6:
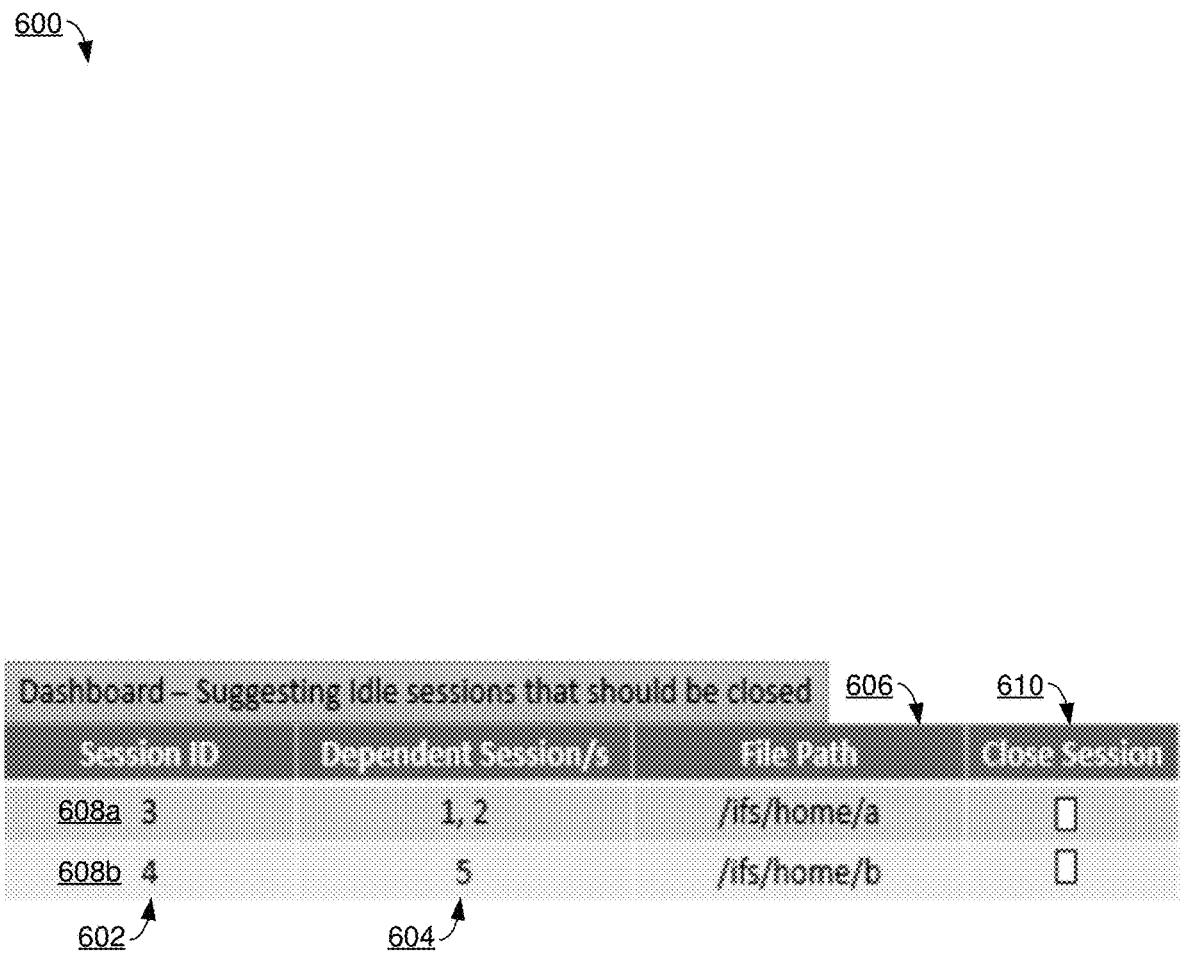
FIG. 6 illustrates another example user interface that identifies one or more idle SMB sessions that should be closed, in accordance with certain embodiments of this disclosure.
Figure 7:
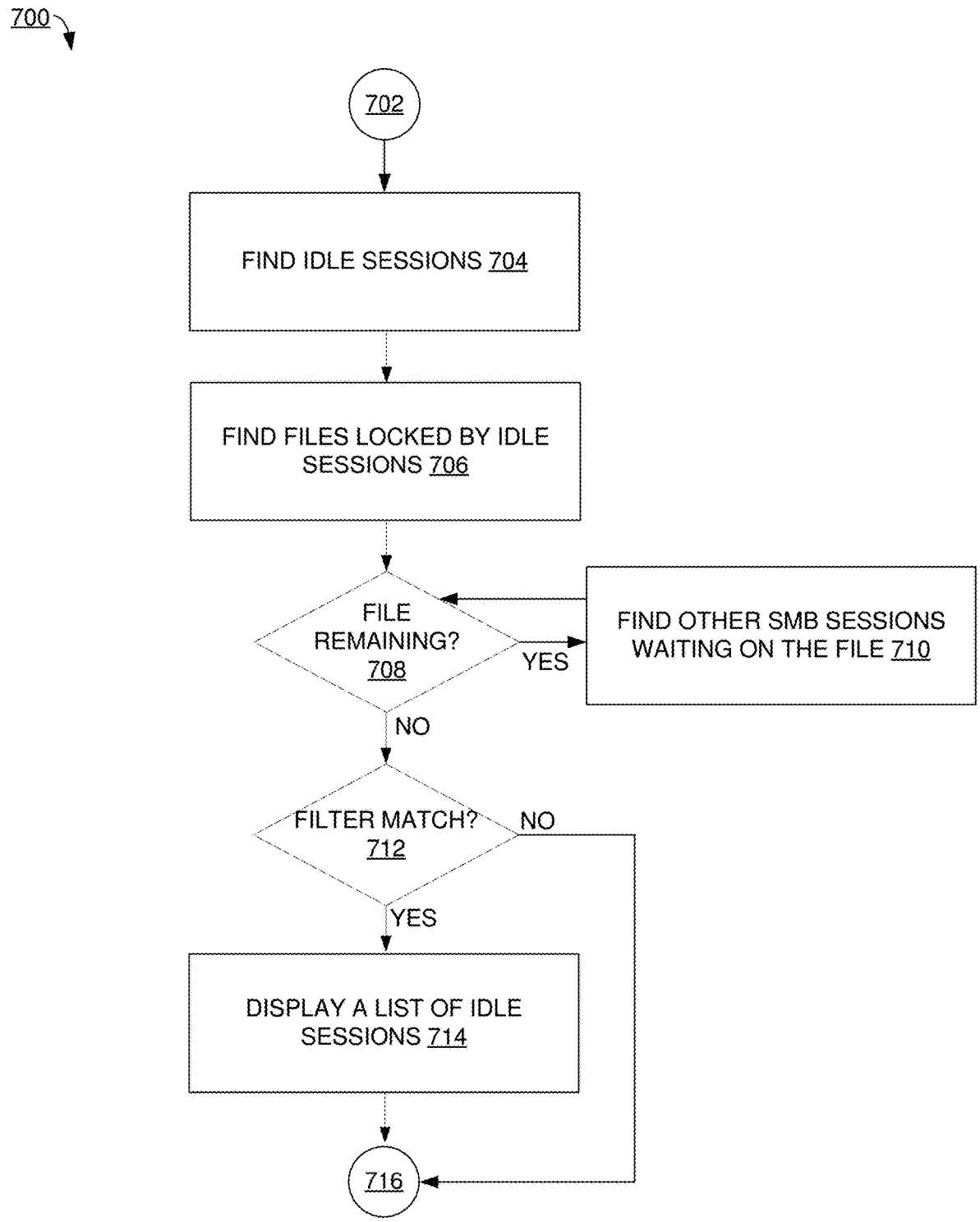
FIG. 7 illustrates an example process flow that can facilitate identifying and deleting idle remote sessions in a distributed file system, in accordance with certain embodiments of this disclosure.
Figure 8:
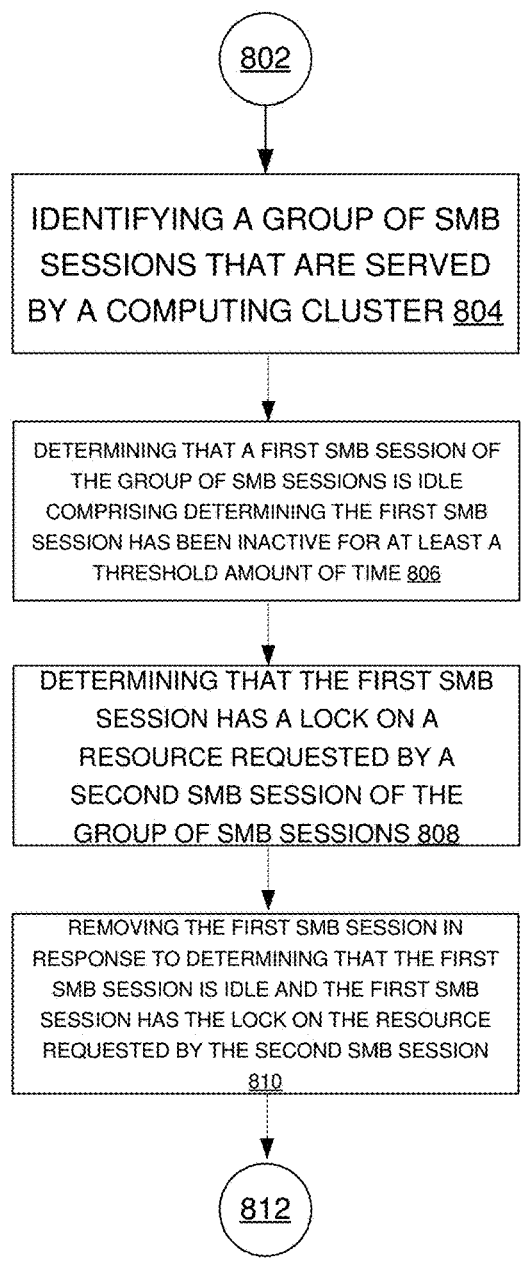
FIG. 8 illustrates another example process flow that can facilitate identifying and deleting idle remote sessions in a distributed file system, in accordance with certain embodiments of this disclosure.
Figure 9:
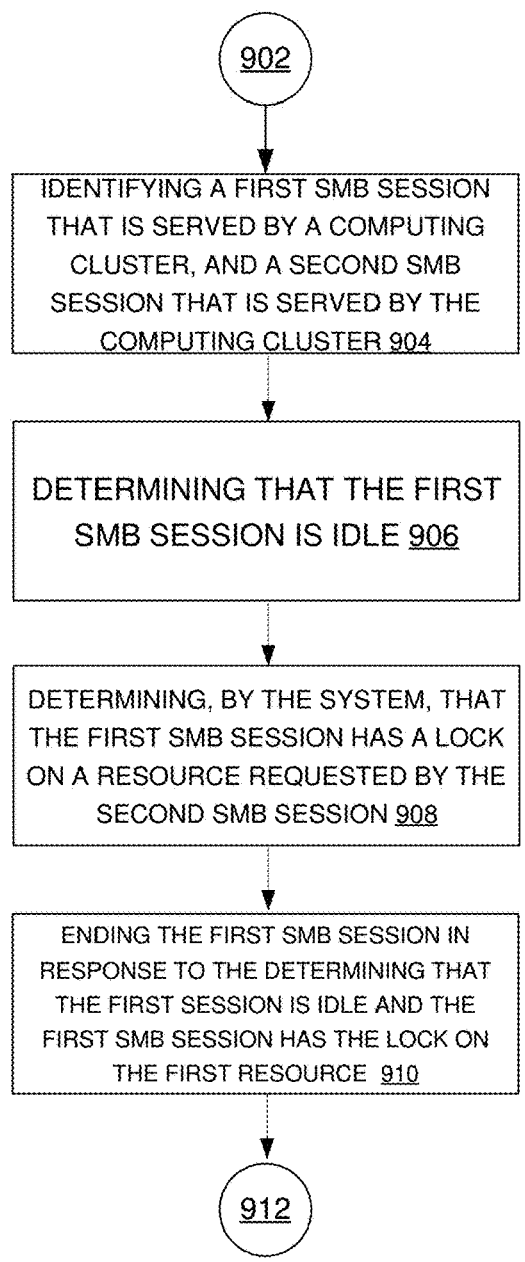
FIG. 9 illustrates another example process flow that can facilitate identifying and deleting idle remote sessions in a distributed file system, in accordance with certain embodiments of this disclosure.
Figure 10:
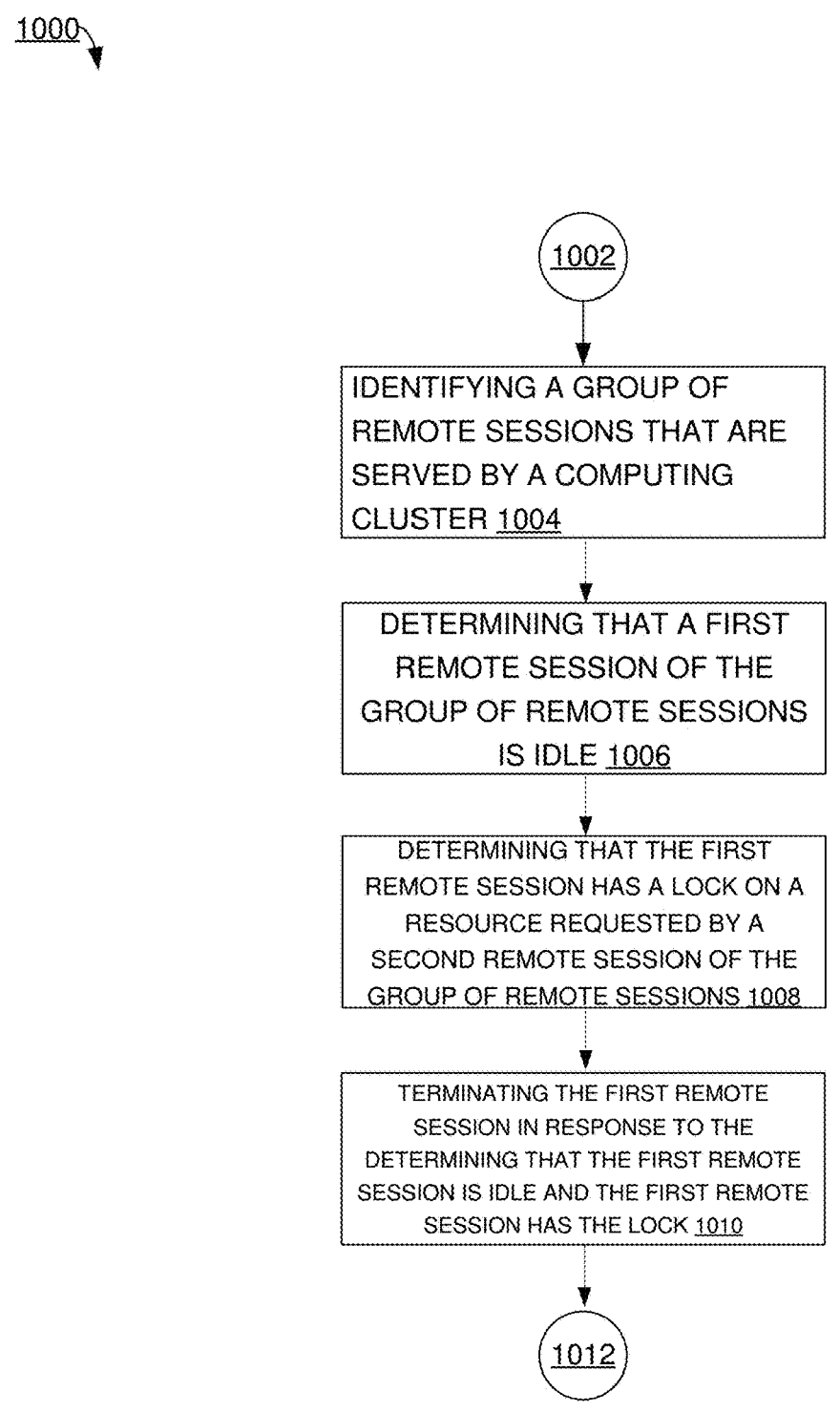

To that end, idle session component 106 can implement aspects of process flow 700 of FIG. 7, process flow 800 of FIG. 8, process flow 900 of FIG. 9, and/or process flow 1000 of FIG. 10. Idle session component 106 can also create and/or provide aspects of user interface 400 of FIG. 4, user interface 500 of FIG. 5, and/or user interface 600 of FIG. 6. For example, idle session component 106 can create the information in these user interfaces and send that information to a remote computer that is accessible by an administrator of SMB server 104, so that the administrator can view the user interfaces and make decisions about idle sessions based on the information provided in those user interfaces.

SMB server 104 also comprises cluster 108. Cluster 108 can comprise a computer cluster made up of a plurality of computers, some of which can be referred to as computing nodes, or nodes. In some examples, each node of cluster 108 can be configured to serve a SMB session, such as to client 102a or client 102b.

Figure 2:
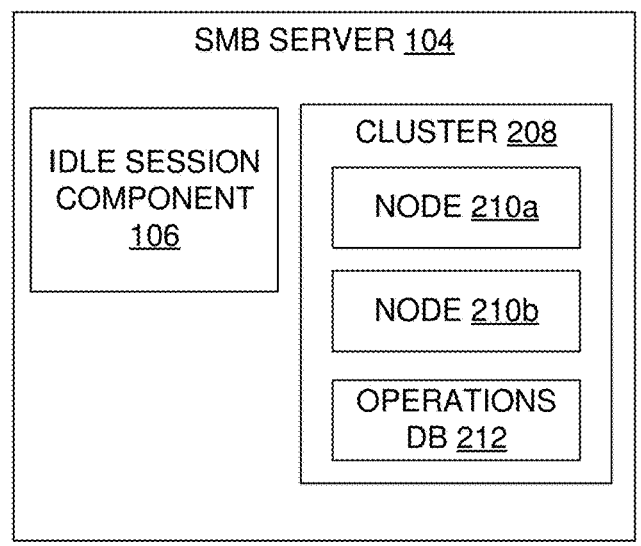
FIG. 2 illustrates another block diagram of an example computer system that can facilitate identifying and deleting idle remote sessions in a distributed file system, in accordance with certain embodiments of this disclosure.

FIG. 2 illustrates another block diagram of an example computer system 200 that can facilitate identifying and deleting idle remote sessions in a distributed file system, in accordance with certain embodiments of this disclosure.

Computer system 200 comprises SMB server 204, idle session component 206, and cluster 208. In some examples, SMB server 204 can be similar to SMB server 104 of FIG. 1; idle session component 206 can be similar to idle session component 106 of FIG. 1; and/or cluster 208 can be similar to cluster 108 of FIG. 1.

In turn, cluster 208 comprises computing node 210a, computing node 210b, and operations database 212. In some examples, each of node 210a and node 210b can comprise a separate instance of a computer or a separate virtualized instance. A node can have its own processing resources (such as a memory space) and execute its own operating instance. In some examples, each node in a cluster can perform the same function. Using the example of computer system 200, each node of cluster 108 can be configured to serve a SMB session, such as to client 102a and/or client 102b.

Then, as client 102a and/or client 102b perform operations on resources of SMB server 204, these operations can be logged in operations database 212. Operations database 212 can be communicatively coupled to each node (node 210a and node 210b) of cluster 208. When node 210a and/or node 210b attempts to process an operation on a resource of SMB server 204, that node can first query operations database 212, such as to see if another session has a lock on the requested resource. Node 210a and/or node 210b can also query operations database 212 to do things like indicate that this node is creating a lock on a particular resource, or is releasing a lock on a particular resource.

Operations database 212 can store indications of these various operations to keep track of locks on databases for node cluster 208. Operations database 212 can comprise a computer database that is stored on one or more computers.

Figure 3:
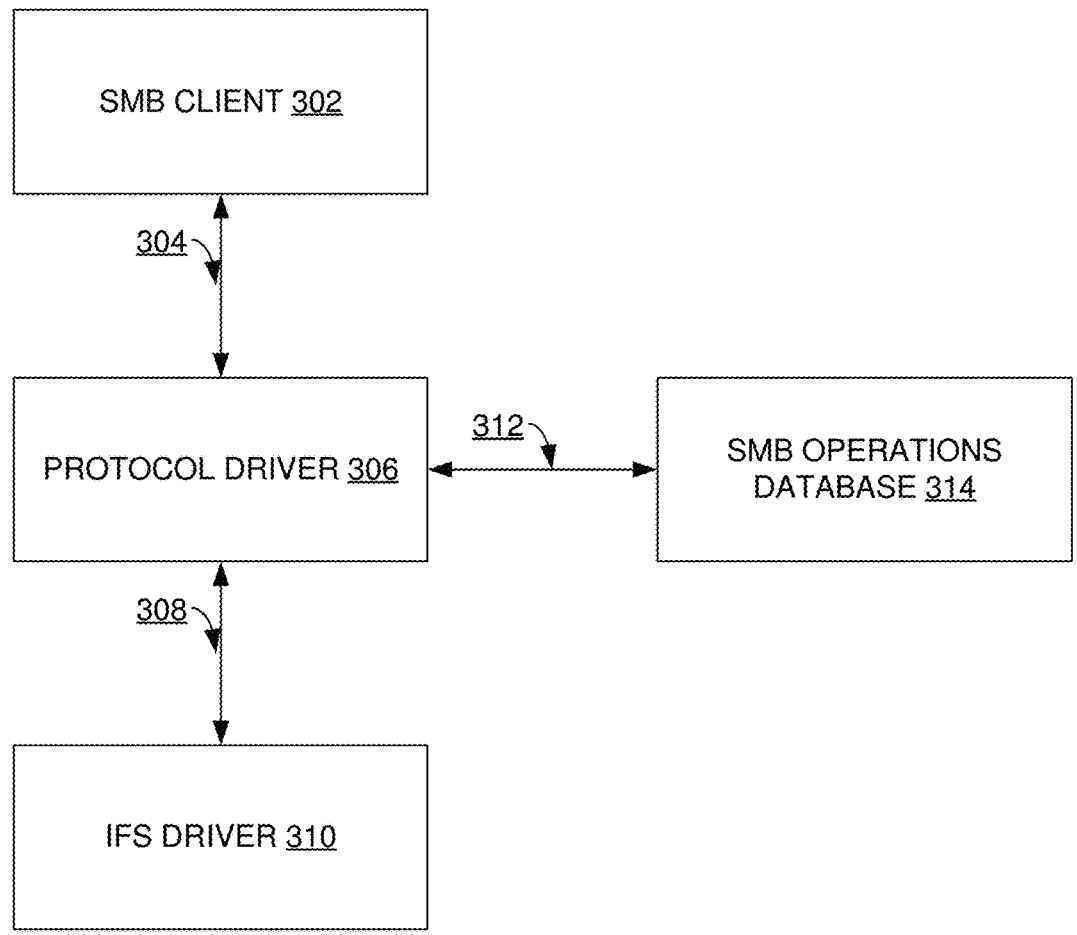
FIG. 3 illustrates a block diagram of an example protocol driver that can facilitate identifying and deleting idle remote sessions in a distributed file system, in accordance with certain embodiments of this disclosure.

FIG. 3 illustrates a block diagram of an example protocol driver system 300 that can facilitate identifying and deleting idle remote sessions in a distributed file system, in accordance with certain embodiments of this disclosure. In some examples, aspects of protocol driver system 300, such as protocol driver 306 can be used to implement idle session component 106 of FIG. 1 or idle session component 206 of FIG. 2.

Protocol driver system 300 comprises SMB client 302, protocol driver 306, IFS (Integrated File System) driver 310, and SMB operations database 314. In some examples, SMB client 302 can be similar to client 102a of FIG. 1, or client 102b of FIG. 1. In some examples, SMB operations database 314 can be similar to operations database 212 of FIG. 2. IFS driver 310 can be utilized to read from, write to, and modify files stored in computer storage.

SMB operations 304 are sent between SMB client 302 and protocol driver 306. These operations can include requests to read, write, or modify a file. Database operations 312 are sent between protocol driver 306 and SMB operations database 314. In some examples, database operations 312 are sent from protocol driver 306 to SMB operations database 314. These operations can include operations on SMB operations database 314 to determine whether a SMB session has a lock on a file, and request a lock on a file. File system operations 308 are sent between protocol driver 306 and IFS driver 310. These operations can include operations on a computer file system, such as to read, write, or modify a file.

For example, SMB client 302 can send a request to access a file, via SMB operations 304 that is sent to protocol driver 306. Protocol driver 306 can receive this request from SMB client 302, and query SMB operations database 314 with database operations 312 for a lock for the file. If the file is locked, SMB operations database 314 can respond to protocol driver 306 that the file is locked. If the file is not locked, SMB operations database 314 can record that the file is now locked by SMB client 302 and indicate that to protocol driver 306.

If the file is locked, protocol driver 306 can indicate to SMB client 302 that SMB client 302 does not currently have access to the file. If SMB operations database 314 indicated that SMB client 302 now has access to the file, then protocol driver 306 can perform the file operation that is requested by SMB client 302 by sending file system operations 308 to IFS driver 310.

Example User Interfaces

FIG. 4 illustrates an example user interface 400 that presents information that can be fetched from SMB operations database, in accordance with certain embodiments of this disclosure. User interface 400 can be produced by idle session component 106 of FIG. 1 or idle session component 206 of FIG. 2. User interface 400 can be presented to an administrator of SMB server 104 of FIG. 1 or SMB server 204 of FIG. 2 so that the administrator can make decisions about whether or not to delete a particular session.

In some examples, in addition to user interface 400, user interface 500 of FIG. 5 and user interface 600 of FIG. 6 can give further information about the sessions identified in user interface 400, and an administrator of a system can access a combination of user interface 400, user interface 500, and user interface 600 to facilitate identifying and deleting idle remote sessions in a distributed file system.

User interface 400 generally comprises a table. The table of user interface 400 comprises column 402 (which indicates a session ID), column 404 (which indicates an amount of time that a session identified in column 402 has been active), and column 406 (which indicates an amount of time that a session identified in column 402 has been idle). An active time in column 404 indicates an amount of time since the session has become active. This value can keep increasing with time. An idle time in column 406 indicates an amount of time since the session became idle. This value can be reset whenever an operation occurs through the session (e.g., a remote computer makes a request to read a file stored in the distributed file system).

The table of user interface 400 also comprises row 408a, row 408b, row 408c, row 408d, and row 408e. Each of these five rows—row 408a, row 408b, row 408c, row 408d, and row 408e—gives information about a different remote session that is connected to, for example, SMB server 104 of FIG. 1 or SMB server 204 of FIG. 2. For example, row 408a gives information about session 1 (as indicated in column 402), which has an active time of 98,765 seconds (as indicated in column 404), and an idle time of 20 seconds (as indicated in column 406). Similarly, row 408b gives information about session 2 (as indicated in column 402), which has an active time of 87,654 seconds (as indicated in column 404), and an idle time of 20 seconds (as indicated in column 406).

Then, row 408c gives information about session 3 (as indicated in column 402), which has an active time of 76,543 seconds (as indicated in column 404), and an idle time of 600 seconds (as indicated in column 406). Row 408d gives information about session 4 (as indicated in column 402), which has an active time of 65,432 seconds (as indicated in column 404), and an idle time of 700 seconds (as indicated in column 406). Finally, row 408e gives information about session 5 (as indicated in column 402), which has an active time of 54,321 seconds (as indicated in column 404), and an idle time of 10 seconds (as indicated in column 406).

FIG. 5 illustrates another example user interface 500 that presents information that can be fetched from SMB operations database, in accordance with certain embodiments of this disclosure. User interface 500 can be produced by idle session component 106 of FIG. 1 or idle session component 206 of FIG. 2. User interface 500 can be presented to an administrator of SMB server 104 of FIG. 1 or SMB server 204 of FIG. 2 so that the administrator can make decisions about whether or not to delete a particular session.

In some examples, in addition to user interface 500, user interface 400 of FIG. 4 and user interface 600 of FIG. 6 can give further information about the sessions identified in user interface 500, and an administrator of a system can access a combination of user interface 500, user interface 400, and user interface 600 to facilitate identifying and deleting idle remote sessions in a distributed file system.

User interface 500 generally comprises a table. The table of user interface 500 comprises column 502 (which indicates a session ID), column 504 (which indicates a file path in a computer file system for a resource for which the corresponding session identified by the session ID of column 502 has acquired a lock or is attempting to acquire a lock), column 506 (which indicates a type of lock possessed or requested by the session identified by the session ID of column 502—e.g., an exclusive lock or a non-exclusive lock), and column 510 (which indicates whether the session identified by the session ID of column 502 has acquired the lock indicated in column 506 on the resource indicated in column 504; values can comprise True and False).

The table of user interface 500 also comprises row 508a, row 508b, row 508c, row 508d, and row 508e. Each of these five rows—row 508a, row 508b, row 508c, row 508d, and row 508e—gives information about a different remote session that is connected to, for example, SMB server 104 of FIG. 1 or SMB server 204 of FIG. 2. For example, row 508a gives information about session 1 (as indicated in column 502), which has or is requesting access to a resource at /ifs/home/a (as indicated in column 504), an indication that an Exclusive lock on that resource of column 504 is required (as indicated in column 506), and an indication that the lock has not yet been acquired (False; as indicated in column 510). Similarly, row 508b gives information about session 2 (as indicated in column 502), which has or is requesting access to a resource at /ifs/home/a (the same resource as requested by session 1 in row 508a; as indicated in column 504), an indication that an Exclusive lock on that resource of column 504 is required (as indicated in column 506), and an indication that the lock has not yet been acquired (False; as indicated in column 510).

Then, row 508c gives information about session 3 (as indicated in column 502), which has or is requesting access to a resource at /ifs/home/a (the same resource as requested by session 1 in row 508a and by session 2 in row 508b; as indicated in column 504), an indication that an Exclusive lock on that resource of column 504 is required (as indicated in column 506), and an indication that the lock has been acquired (True; as indicated in column 510). Since row 508c indicates that session 3 has an exclusive lock on the resource /ifs/home/a, then session 1 (of row 508a) and session 2 (of row 508b) cannot also have a lock on that same resource, despite requesting one.

Row 508d gives information about session 4 (as indicated in column 502), which has or is requesting access to a resource at /ifs/home/b (as indicated in column 504), an indication that an Exclusive lock on that resource of column 504 is required (as indicated in column 506), and an indication that the lock has been acquired (True; as indicated in column 510). Finally, row 508e gives information about session 5 (as indicated in column 502), which has or is requesting access to a resource at /ifs/home/b (the same resource as requested by session 4 in row 508d; as indicated in column 504), an indication that an Exclusive lock on that resource of column 504 is required (as indicated in column 506), and an indication that the lock has not yet been acquired (False; as indicated in column 510). Since session 4 in row 508d already has an exclusive lock on the resource /ifs/home/b, then session 5 in row 508e cannot acquire a lock on this same resource until session 4 releases its lock on the resource.

FIG. 6 illustrates another example user interface 600 that identifies one or more idle SMB sessions that should be closed, in accordance with certain embodiments of this disclosure. User interface 600 can be produced by idle session component 106 of FIG. 1 or idle session component 206 of FIG. 2. User interface 600 can be presented to an administrator of SMB server 104 of FIG. 1 or SMB server 204 of FIG. 2 so that the administrator can make decisions about whether or not to delete a particular session.

In some examples, in addition to user interface 600, user interface 400 of FIG. 4 and user interface 500 of FIG. 5 can give further information about the sessions identified in user interface 600, and an administrator of a system can access a combination of user interface 600, user interface 400, and user interface 500 to facilitate identifying and deleting idle remote sessions in a distributed file system.

User interface 600 generally comprises a table. The table of user interface 600 comprises column 602 (which indicates a session ID), column 604 (which indicates one or more dependent session IDs), column 606 (which indicates a file path in a computer file system for a resource for which the corresponding session identified by the session ID of column 602 has acquired a lock), and column 610 (which provides a user interface element that can receive user input indicative of closing the session indicated in column 602).

The table of user interface 600 also comprises row 608a and row 608b. Each of these two rows—row 608a and row 608b—gives information about a different remote session that is connected to, for example, SMB server 104 of FIG. 1 or SMB server 204 of FIG. 2.

For example, row 608a gives information about session 3 (as indicated in column 602), which has a lock on a resource requested by both session 1 and session 2 (as indicated in column 604; in this context, session 1 and session 2 can each be referred to as a dependent session of session 3), an indication of the resource in question (/ifs/home/a; as indicated in column 606), and a user interface element that can receive user input indicative of closing session 3 (as indicated in column 610).

Similarly, row 608b gives information about session 4 (as indicated in column 602), which has a lock on a resource requested by session 5 (as indicated in column 604; in this context, session 5 can be referred to as a dependent session of session 4), an indication of the resource in question (/ifs/home/b; as indicated in column 606), and a user interface element that can receive user input indicative of closing session 4 (as indicated in column 610).

These dependent sessions indicated in user interface 600 can be seen in user interface 500 of FIG. 5. In user interface 500, it can be seen that each of session 1, session 2, and session 3 have or want access to resource/ifs/home/a, and that session 3 has a lock on that resource while session 1 and session 2 do not yet have access to the resource. Thus, session 1 and session 2 are dependent on session 3. Similarly, in user interface 500, it can be seen that each of session 4 and session 5 have or want access to resource/ifs/home/b, and that session 4 has a lock on the resource while session 5 does not yet have access to the resource. Thus, session 5 is dependent on session 4.

Example Operating Procedures

FIG. 7 illustrates an example process flow 700 that can facilitate identifying and deleting idle remote sessions in a distributed file system, in accordance with certain embodiments of this disclosure. In some examples, aspects of process flow 700 can be implemented by idle session component 106 of FIG. 1, idle session component 206 of FIG. 2, or protocol driver 306 of FIG. 3. It can be appreciated that the operating procedures of process flow 700 are example operating procedures, and that there can be embodiments that implement more or fewer operating procedures than are depicted, or that implement the depicted operating procedures in a different order than as depicted.

Process flow 700 begins with 702, and then moves to operation 704. Operation 704 depicts finding idle sessions. In some examples, idle session component 106 of FIG. 1, idle session component 206 of FIG. 2, or protocol driver 306 of FIG. 3 can monitor session activity and maintain information about how long of a time has passed since a session has been active.

For example, in embodiments where SMB operations from a client pass through protocol driver 306, protocol driver 306 can maintain a list of sessions each with a timer, and reset the timer for a particular session each time that protocol driver 306 receives a SMB operation associated with that session. In such examples, finding the idle sessions can comprise determining which sessions in this list of sessions have been idle for at least a predetermined threshold amount of time (e.g., 500 seconds). Those sessions that have been idle for at least the predetermined threshold amount of time can be considered to be idle. After operation 704, process flow 700 moves to operation 706.

Operation 706 depicts finding the files locked by the idle sessions. In some examples, as one or more clients requests that SMB operations are performed, which includes requesting, obtaining, and releasing locks on certain files, SMB operations database 314 of FIG. 3 can maintain a list of these locks, along with the associated file, and associated SMB session.

In such examples, finding the files locked by the idle sessions can comprise taking the idle sessions identified in operation 704, and querying SMB operations database 314 for files that are accessed by those sessions. After operation 706, process flow 700 moves to operation 708.

Operation 708 depicts analyzing each file identified in operation 708. In some examples, implementing operation 708 can comprise querying SMB operations database 314 to determine whether the file has a lock on it. Where in operation 708 it is determined that the file is locked by the idle session, then process flow 700 moves to operation 710. Instead, where in operation 708 it is determined that the file is not locked by the idle session, then process flow 700 moves to operation 712.

Operation 710 is reached from operation 708 where it is determined in operation 708 that there is another file to analyze. Operation 710 depicts finding other SMB sessions waiting on the file. In some examples, implementing operation 710 can comprise querying SMB operations database 314 for SMB sessions that are waiting to access a file locked by the idle session identified in operation 708. After operation 710, process flow 700 returns to operation 708. Loops comprising operation 708 and operation 710 may be performed to identify SMB sessions that are waiting on files locked by idle sessions.

Operation 712 is reached from operation 708 where it is determined in operation 708 that there is not another file to analyze. Operation 712 depicts determining whether there is a filter match. In some examples, a filter on results can be implemented in a user interface, such as user interface 400 of FIG. 4, user interface 500 of FIG. 5, and/or user interface 600 of FIG. 6. A filter can comprise one or more criteria, where a result is shown in the user interface where it matches the one or more criteria. This one or more criteria can comprise a user, a client IP address, and/or a file or resource.

Where in operation 712 it is determined that there is a filter match, process flow 700 moves to operation 714. Instead, where in operation 710 it is determined that there is not a filter match, process flow 700 moves to 716 where process flow 700 ends.

Operation 714 is reached from operation 712 where it is determined in operation 712 that there is not a filter match. Operation 714 depicts displaying a list of idle sessions. Displaying this list can comprise generating user interface 400 of FIG. 4, user interface 500 of FIG. 5, and/or user interface 600 of FIG. 6. In some examples, such a user interface can be generated by idle session component 106 of FIG. 1 or idle session component 206 of FIG. 2 and sent to a computer accessible by an administrator of SMB server 104 of FIG. 1 or SMB server 204 of FIG. 2 to be displayed to the administrator on a computer display, such as in a graphical user interface, or a command line interface. After operation 714, process flow 700 moves to 716, where process flow 700 ends.

FIG. 8 illustrates another example process flow 800 that can facilitate identifying and deleting idle remote sessions in a distributed file system, in accordance with certain embodiments of this disclosure. In some examples, aspects of process flow 800 can be implemented by idle session component 106 of FIG. 1, idle session component 206 of FIG. 2, or protocol driver 306 of FIG. 3. It can be appreciated that the operating procedures of process flow 800 are example operating procedures, and that there can be embodiments that implement more or fewer operating procedures than are depicted, or that implement the depicted operating procedures in a different order than as depicted.

Process flow 800 begins with 802, and moves to operation 804. Operation 804 depicts identifying a group of SMB sessions that are served by a computing cluster. Operation 804 can comprise determining what SMB sessions are served by a cluster. In some examples, operation 804 can be implemented in a similar manner as operation 704 of FIG. 7, as applied to identifying sessions. For example, identifying a group of SMB sessions can comprise maintaining a list of SMB sessions by SMB operations database 314 of FIG. 3, or protocol driver 306 of FIG. 3.

In some examples, operation 804 is performed by a protocol driver, such as Protocol driver 306 of FIG. 3. After operation 804, process flow 800 moves to operation 806.

Operation 806 depicts determining that a first SMB session of the group of SMB sessions is idle comprising determining the first SMB session has been inactive for at least a threshold amount of time. Operation 806 can comprise finding idle SMB sessions. In some examples, operation 806 can be implemented in a similar manner as operation 704, as applied to identifying those SMB sessions that are also idle.

In some examples, the first SMB session is served by a first node of the computing cluster, and the second SMB session is served by a second node of the computing cluster. That is, the various SMB sessions can execute across multiple nodes of a cluster, though one SMB session on one node can have a lock on a resource requested by another SMB session of another node.

In some examples, operation 806 is performed by a SMB protocol driver, such as protocol driver 306 of FIG. 3. After operation 806, process flow 800 moves to operation 808.

Operation 808 depicts determining that the first SMB session has a lock on a resource requested by a second SMB session of the group of SMB sessions. Operation 808 can comprise, of those idle SMB sessions identified in operation 806, identifying which idle sessions have a lock on a resource that another SMB session wants access to. In some examples, operation 808 can be implemented in a similar manner as operations 708 and 710 of FIG. 7.

In some examples, the resource comprises a computer file. In some examples, the lock comprises an exclusive lock on the resource, or the lock comprises a non-exclusive lock on the resource and the second SMB session has requested an exclusive lock on the resource.

In some examples, operation 808 comprises accessing a data store that stores information about the lock. In some examples, the data store is accessible via a first computing node of the computing cluster and a second computing node of the computing cluster. That is, one data store can serve, and can be accessed by, multiple (or all) nodes of the computing cluster.

In some examples, determining that the first SMB session has the lock is performed in response to the determining that the first SMB session is idle in operation 806. In some examples, operation 808 is performed by a SMB protocol driver, such as protocol driver 306 of FIG. 3, such as protocol driver 306 of FIG. 3. After operation 808, process flow 800 moves to operation 810.

Operation 810 depicts removing the first SMB session in response to the determining that the first SMB session is idle and the determining that the first SMB session has the lock on the resource requested by the second SMB session. Operation 810 can comprise, of those idle SMB sessions that have a lock on a resource that another SMB session wants access to in operation 808, terminating at least one of these idle SMB sessions.

In some examples, operation 810 can comprise presenting information about at least one of the group of SMB sessions in a user interface of the system. That is, this can comprise providing a user interface dashboard to an administrator. Then, user input indicative of terminating a particular SMB session can be received at the user interface dashboard. In such examples, operation 810 can be implemented in a similar manner as operation 714 of FIG. 7.

In some examples, presenting information about at least one of the group of SMB sessions in a user interface of the system comprises performing the removing of the first SMB session in response to receiving a user input via the user interface that is indicative of a request to remove the first SMB session. That is, a system can propose to remove an idle SMB session to an administrator, and the administrator can then choose to remove it by providing input to the user input.

In some examples, operation 810 can comprise presenting information about at least one of the group of SMB sessions in a user interface of the system, the at least one of the group of SMB sessions corresponding to a user. That is, a user interface dashboard can filter results based on user.

In some examples, operation 810 can comprise presenting information about at least one of the group of SMB sessions in a user interface of the system, the at least one of the group of SMB sessions corresponding to a client Internet Protocol (IP) address. That is, a user interface dashboard can filter results based on client IP address.

In some examples, operation 810 can comprise presenting information about at least one of the group of SMB sessions in a computer user interface, the at least one of the group of SMB sessions corresponding to the resource. That is, a user interface dashboard can filter results based on a file or resource.

In some examples, operation 810 comprises initiating an application programming interface call to filter at least a third SMB session of the group of SMB sessions from a group of at least one SMB session that is displayed in a user interface.

In some examples, operation 810 comprises terminating of the first SMB session as facilitated via a remote computer that comprises a client in the first SMB session.

In some examples, determining a group of at least one SMB session that is requesting the resource, the group of at least one SMB session comprising the second SMB session, is performed in response to the determining that the first SMB session has the lock in operation 808.

In some examples, operation 810 is performed by a SMB protocol driver, such as protocol driver 306 of FIG. 3, such as protocol driver 306 of FIG. 3. After operation 810, process flow 800 moves to 812, where process flow 800 ends.

FIG. 9 illustrates another example process flow 900 that can facilitate identifying and deleting idle remote sessions in a distributed file system, in accordance with certain embodiments of this disclosure. In some examples, aspects of process flow 900 can be implemented by idle session component 106 of FIG. 1, idle session component 206 of FIG. 2, or protocol driver 306 of FIG. 3. It can be appreciated that the operating procedures of process flow 900 are example operating procedures, and that there can be embodiments that implement more or fewer operating procedures than are depicted, or that implement the depicted operating procedures in a different order than as depicted.

Process flow 900 begins with 902, and moves to operation 904. Operation 904 depicts identifying a first SMB session that is served by a computing cluster, and a second SMB session that is served by the computing cluster. Operation 904 can comprise determining what SMB sessions are served by a cluster. In some examples, operation 904 can be implemented in a similar manner as operation 804 of FIG. 8.

In some examples, operation 904 is performed by a SMB protocol driver, such as protocol driver 306 of FIG. 3. After operation 904, process flow 900 moves to operation 906.

Operation 906 depicts determining that the first SMB session is idle. Operation 806 can comprise finding idle SMB sessions. In some examples, determining that the first SMB session is idle comprises determining that the first SMB session is idle in response to determining that the first SMB session has been inactive for at least the threshold amount of time. In some examples, operation 906 can be implemented in a similar manner as operation 806 of FIG. 8.

In some examples, operation 906 is performed by a SMB protocol driver, such as protocol driver 306 of FIG. 3. After operation 906, process flow 900 moves to operation 908.

Operation 908 depicts determining that the first SMB session has a lock on a resource requested by the second SMB session. Operation 908 can comprise, of those idle SMB sessions identified in operation 906, identifying which idle sessions have a lock on a resource that another SMB session wants access to. In some examples, operation 908 can be implemented in a similar manner as operation 808 of FIG. 8.

In some examples, the resource comprises a computer file. In some examples, the lock comprises an exclusive lock on the resource, or the lock comprises a non-exclusive lock on the resource and the second SMB session has requested an exclusive lock on the resource.

In some examples, operation 908 comprises accessing a data store that stores information about the lock. In some examples, this data store can comprise SMB operations database 314 of FIG. 3. In some examples, the data store is accessible via a first computing node of the computing cluster and a second computing node of the computing cluster. That is, one data store can serve, and can be accessed by, multiple (or all) nodes of the computing cluster.

In some examples, determining that the first SMB session has the lock is performed in response to the determining that the first SMB session is idle in operation 906. In some examples, operation 908 is performed by a SMB protocol driver, such as protocol driver 306 of FIG. 3. After operation 908, process flow 900 moves to operation 910.

Operation 910 depicts ending the first SMB session in response to the determining that the first session is idle and the determining that the first SMB session has the lock on the first resource requested by the second SMB session. Operation 910 can comprise, of those idle SMB sessions that have a lock on a resource that another SMB session wants access to in operation 908, terminating at least one of these idle SMB sessions. In some examples, operation 910 can be implemented in a similar manner as operation 810 of FIG. 8.

In some examples, operation 910 comprises initiating an application programming interface call to filter at least a third SMB session of the group of SMB sessions from a group of at least one SMB session that is displayed in a user interface.

In some examples, operation 910 comprises terminating of the first SMB session as facilitated via a remote computer that comprises a client in the first SMB session.

In some examples, determining a group of at least one SMB session that is requesting the resource, the group of at least one SMB session comprising the second SMB session, is performed in response to the determining that the first SMB session has the lock in operation 908.

In some examples, operation 910 is performed by a SMB protocol driver, such as protocol driver 306 of FIG. 3. After operation 910, process flow 900 moves to 912, where process flow 900 ends.

FIG. 10 illustrates another example process flow 1000 that can facilitate identifying and deleting idle remote sessions in a distributed file system, in accordance with certain embodiments of this disclosure. In some examples, aspects of process flow 1000 can be implemented by idle session component 106 of FIG. 1, idle session component 206 of FIG. 2, or protocol driver 306 of FIG. 3. It can be appreciated that the operating procedures of process flow 1000 are example operating procedures, and that there can be embodiments that implement more or fewer operating procedures than are depicted, or that implement the depicted operating procedures in a different order than as depicted.

Process flow 1000 begins with 1002 and moves to operation 1004. Operation 1004 depicts identifying a group of remote sessions that are served by a computing cluster. Operation 1004 can comprise determining what remote sessions are served by a cluster, and these remote sessions can comprise SMB sessions. In some examples, operation 1004 can be implemented in a similar manner as operation 804 of FIG. 8.

In some examples, operation 1004 is performed by a SMB protocol driver, such as protocol driver 306 of FIG. 3. After operation 1004, process flow 1000 moves to operation 806.

Operation 1006 depicts determining that a first remote session of the group of remote sessions is idle. Operation 1006 can comprise finding idle remote sessions. In some examples, determining that the first remote session is idle comprises determining that the first remote session is idle in response to determining that the first remote session has been inactive for at least the threshold amount of time. In some examples, operation 1006 can be implemented in a similar manner as operation 806 of FIG. 8.

In some examples the first remote session and the second remote session each comprise a SMB session. In some examples, operation 1006 is performed by a SMB protocol driver, such as protocol driver 306 of FIG. 3. After operation 1004, process flow 1000 moves to operation 806.

Operation 1008 depicts determining that the first remote session has a lock on a resource requested by a second remote session of the group of remote sessions. Operation 908 can comprise, of those idle remote sessions identified in operation 1006, identifying which idle sessions have a lock on a resource that another remote session wants access to. In some examples, operation 1008 is implemented in a similar manner as operation 808 of FIG. 8.

In some examples, the resource comprises a computer file. In some examples, the lock comprises an exclusive lock on the resource, or the lock comprises a non-exclusive lock on the resource and the second remote session has requested an exclusive lock on the resource.

In some examples, operation 1008 comprises accessing a data store that stores information about the lock. In some examples, the data store is accessible via a first computing node of the computing cluster and a second computing node of the computing cluster. That is, one data store can serve, and can be accessed by, multiple (or all) nodes of the computing cluster.

In some examples, determining that the first remote session has the lock is performed in response to the determining that the first remote session is idle in operation 1006. In some examples, operation 1008 is performed by a SMB protocol driver, such as protocol driver 306 of FIG. 3. After operation 1008, process flow 1000 moves to operation 1010.

Operation 1010 depicts terminating the first remote session in response to the determining that the first remote session is idle and the determining that the first remote session has the lock on the resource requested by the second remote session. Operation 1010 can comprise, of those idle remote sessions that have a lock on a resource that another remote session wants access to in operation 1008, terminating at least one of these idle remote sessions.

In some examples, operation 1010 comprises initiating an application programming interface call to filter at least a third remote session of the group of remote sessions from a group of at least one remote session that is displayed in a user interface.

In some examples, operation 1010 comprises terminating of the first remote session as facilitated via a remote computer that comprises a client in the first remote session.

In some examples, determining a group of at least one remote session that is requesting the resource, the group of at least one remote session comprising the second remote session, is performed in response to the determining that the first remote session has the lock in operation 1008.

In some examples, operation 1010 is performed by a SMB protocol driver, such as protocol driver 306 of FIG. 3. After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented. For example, aspects of computing environment 1100 can be used to implement aspects of client 102a, client 102b, and/or SMB server 104 of FIG. 1, SMB server 204 of FIG. 2, and/or SMB client 302, protocol driver 306, IFS driver 310, and/or SMB operations database 314 of FIG. 3. In some examples, computing environment can implement aspects of the process flows of FIGS. 7-10 to facilitate identifying and deleting idle remote sessions in a distributed file system.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/ wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server,"

"node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      identifying a first group of idle server message block (SMB) sessions that are served by a computing cluster;
      after the identifying of the first group of idle SMB sessions, determining, from the first group of idle SMB sessions, a second group of at least one file that is locked, the second group of at least one file being locked by the first group of idle SMB sessions;
      after determining the second group of at least one file that is locked, determining, from the second group of at least one file that is locked, a third group of at least one SMB session that is waiting to access one or more files of the second group of at least one file that is locked; and
      after determining the third group of at least one SMB session that is waiting to access one or more files of the second group of at least one file that is locked, removing a first SMB session of the first group of idle SMB sessions in response to the determining that the first SMB session holds a lock on a first file of the second group of at least one file, based on determining that a second SMB session of the third group of at least one SMB session is waiting to access the first file.

2. The system of claim 1, wherein the operations further comprise:
   presenting information about at least one of the first group of idle SMB sessions in a user interface of the system.

3. The system of claim 2, wherein the operations further comprise:
   performing the removing of the first SMB session in response to receiving a user input via the user interface that is indicative of a request to remove the first SMB session.

4. The system of claim 1, wherein the operations further comprise:
   presenting information about at least one of the first group of idle SMB sessions in a user interface of the system, the at least one of the first group of idle SMB sessions corresponding to a user.

5. The system of claim 1, wherein the operations further comprise:
   presenting information about at least one of the first group of idle SMB sessions in a user interface of the system, the at least one of the first group of idle SMB sessions corresponding to a client Internet Protocol (IP) address.

6. The system of claim 1, wherein the operations further comprise:
   presenting information about at least one of the first group of idle SMB sessions in a computer user interface, the at least one of the first group of idle SMB sessions corresponding to the resource.

7. The system of claim 1, wherein the first SMB session is served by a first node of the computing cluster, and wherein the second SMB session is served by a second node of the computing cluster.

8. A method, comprising:
   identifying, by a system comprising a processor, a first group of idle server message block (SMB) sessions that is served by a computing cluster;
   after the identifying of the first group of idle SMB sessions, determining, by the system, from the first group of idle SMB sessions, a second group of at least one file that is locked, the second group of at least one file being locked by the first group of idle SMB sessions;

after determining the second group of at least one file that is locked, determining, by the system, from the second group of at least one file that is locked, a third group of at least one SMB session that is waiting to access one or more files of the second group of at least one file that is locked; and after determining the third group of at least one SMB session that is waiting to access one or more files of the second group of at least one file that is locked, ending, by the system, a first SMB session of the first group of idle SMB sessions in response to the determining that the first SMB session holds a lock on a first file of the second group of at least one file, based on determining that a second SMB session of the third group of at least one SMB session is waiting to access the first file.

9. The method of claim 8, wherein the identifying of the first group of idle SMB sessions comprises:

determining that the first SMB session is idle in response to determining that the first SMB session has been inactive for at least the threshold amount of time.

10. The method of claim 8, wherein the determining of the second group of at least one file that is locked comprises:

accessing a data store that stores information about file locks.

11. The method of claim 10, wherein the data store is accessible via a first computing node of the computing cluster and a second computing node of the computing cluster.

12. The method of claim 8, wherein the identifying, the determining of the second group, the determining of the third group, and the ending of the first SMB session, are performed by a SMB protocol driver.

13. The method of claim 8, wherein the determining of the third group of at least one SMB session that is waiting to access one or more files is performed based on the second group of at least one file that is locked, that the first SMB session has the lock is performed in response to the determining that the first SMB session is idle.

14. The method of claim 8, wherein the determining of the second group of at least one file that is locked by the first group of idle SMB sessions is performed based on the first group of idle SMB sessions.

15. A non-transitory computer-readable medium comprising instructions that, in response to execution, cause a system comprising a processor to perform operations, comprising:

identifying a first group of idle remote sessions that are served by a computing cluster;

after the identifying of the first group of idle remote sessions, determining, from the first group of idle remote sessions, a second group of at least one file that is locked, the second group of at least one file being locked by the first group of idle remote sessions;

after determining the second group of at least one file that is locked, determining, from the second group of at least one file that is locked, a third group of at least one remote session that is waiting to access one or more files of the second group of at least one file that is locked; and after determining the third group of at least one SMB session that is waiting to access one or more files of the second group of at least one file that is locked, terminating a first remote session of the first group of idle remote sessions in response to the determining that the first remote session holds a lock on a first file of the second group of at least one file, based on determining that a second SMB session of the third group of at least one SMB session is waiting to access the first file.

16. The non-transitory computer-readable medium of claim 15, wherein the operations further comprise:

initiating an application programming interface call to filter at least a second remote session of the group of remote sessions from a fourth group of at least one remote session that is displayed in a user interface.

17. The non-transitory computer-readable medium of claim 15, wherein the first remote session comprises a server message block session.

18. The non-transitory computer-readable medium of claim 15, wherein the terminating of the first remote session comprises the terminating of the first remote session as facilitated via a remote computer that comprises a client in the first remote session.

19. The non-transitory computer-readable medium of claim 15, wherein the lock comprises an exclusive lock on the resource, or the lock comprises a non-exclusive lock on the resource and a second remote session of the third group has requested an exclusive lock on the resource.

20. The non-transitory computer-readable medium of claim 15, wherein the resource comprises a computer file.

\* \* \* \* \*